(12) United States Patent
Patil

(10) Patent No.: US 12,194,871 B2
(45) Date of Patent: Jan. 14, 2025

(54) VEHICULAR CONTROL SYSTEM WITH CONSTANT POWER OUTPUT

(71) Applicant: Magna Electronics Inc., Auburn Hills, MI (US)

(72) Inventor: Gaurav Shrikant Patil, Munich (DE)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

(21) Appl. No.: 18/240,463

(22) Filed: Aug. 31, 2023

(65) Prior Publication Data

US 2024/0067001 A1 Feb. 29, 2024

Related U.S. Application Data

(60) Provisional application No. 63/374,037, filed on Aug. 31, 2022.

(51) Int. Cl.
*B60L 11/02* (2006.01)
*B60L 50/14* (2019.01)
*B60L 50/60* (2019.01)

(52) U.S. Cl.
CPC ............. *B60L 50/60* (2019.02); *B60L 50/14* (2019.02); *B60L 2240/421* (2013.01)

(58) Field of Classification Search
CPC ..... B60L 50/60; B60L 50/14; B60L 2240/421
See application file for complete search history.

(56) References Cited

U.S. PATENT DOCUMENTS

| 4,211,930 | A * | 7/1980 | Fengler ................ B60L 50/13 |
| | | | 318/685 |
| 10,625,621 | B2 * | 4/2020 | Scolari ................ H02J 7/1423 |
| 2003/0094923 | A1 | 5/2003 | Emori et al. |
| 2008/0297970 | A1 * | 12/2008 | Rutz ..................... H05C 1/06 |
| | | | 361/232 |
| 2010/0052619 | A1 | 3/2010 | Bishop et al. |
| 2014/0285936 | A1 | 9/2014 | Garbacik et al. |
| 2015/0048798 | A1 | 2/2015 | Godo et al. |
| 2015/0340743 | A1 | 11/2015 | Fink |
| 2020/0094679 | A1 * | 3/2020 | Mattmuller ............. H02J 1/14 |
| 2020/0195033 | A1 * | 6/2020 | Tajima .................. H02J 7/342 |
| 2022/0302735 | A1 * | 9/2022 | Sakamoto ............ H02J 7/0031 |
| 2023/0182587 | A1 * | 6/2023 | Lepidi .................. B60L 53/11 |
| | | | 320/109 |
| 2024/0100992 | A1 | 3/2024 | Boddi et al. |

* cited by examiner

*Primary Examiner* — Jared Fureman
*Assistant Examiner* — Esayas G Yeshaw
(74) *Attorney, Agent, or Firm* — HONIGMAN LLP

(57) ABSTRACT

A vehicular power system includes a battery disposed at a vehicle, an electrical motor disposed at the vehicle that controls propulsion of the equipped vehicle when powered, a power system controller, and a transformer electrically connected to the battery. The transformer includes a plurality of taps, each tap of the plurality of taps providing a different output voltage. The power system controller, responsive to a vehicle speed request, determines one of the plurality of taps. The power system controller electrically connects the determined one of the plurality of taps to the electrical motor, and electrical power flows from the battery through the determined one of the plurality of taps to the electrical motor. The electrical motor, based on the electrical power from the determined one of the plurality of taps, adjusts speed of propulsion of the equipped vehicle toward the requested vehicle speed.

20 Claims, 3 Drawing Sheets

VEHICULAR CONTROL SYSTEM WITH CONSTANT POWER OUTPUT

CROSS REFERENCE TO RELATED APPLICATION

The present application claims the filing benefits of U.S. provisional application Ser. No. 63/374,037, filed Aug. 31, 2022, which is hereby incorporated herein by reference in its entirety.

FIELD OF THE INVENTION

The present invention relates generally to a vehicle battery system for a vehicle and, more particularly, to a vehicle battery system for an electric vehicle.

BACKGROUND OF THE INVENTION

Electric vehicles generally include large batteries or battery packs to power the vehicle. Battery efficiency is a critical component of most electric vehicles to facilitate longer range before the batteries must be recharged.

SUMMARY OF THE INVENTION

A vehicular power system, the vehicular power system including a battery disposed at a vehicle equipped with the vehicular power system. The battery outputs a constant battery voltage. The system includes an electrical motor disposed at the equipped vehicle. The electrical motor, when electrically powered, controls propulsion of the equipped vehicle. The system includes a power system controller including electronic circuitry and associated software. The system includes a transformer electrically connected to the battery. The transformer includes a plurality of taps, and each tap of the plurality of taps provides a different output voltage transformed from the constant battery voltage. The power system controller, responsive to a vehicle speed request, determines one of the plurality of taps. The power system controller electrically connects the determined one of the plurality of taps to the electrical motor and electrical power flows from the battery through the determined one of the plurality of taps to the electrical motor. The battery provides the electrical power at the constant battery voltage and the electrical motor receives the electrical power at the transformed output voltage of the determined one of the plurality of taps. The electrical motor, based on the electrical power from the determined one of the plurality of taps, adjusts speed of propulsion of the equipped vehicle toward the requested vehicle speed.

These and other objects, advantages, purposes and features of the present invention will become apparent upon review of the following specification in conjunction with the drawings.

DESCRIPTION OF THE PREFERRED EMBODIMENTS

A vehicular battery system and/or vehicle power storage system operates to store and provide power to the vehicle. The vehicle may use the power to move (e.g., via electric motors) and/or operate various accessories (e.g., lights, heating and air conditioning, etc.). The vehicle may be an all-electric vehicle, a plug-in hybrid vehicle, or a hybrid vehicle. The system may include any number or type of power storage components, such as lithium-ion/lithium polymer batteries, nickel-metal hydride batteries, lead-acid batteries, ultracapacitors, etc.

Figure 1:
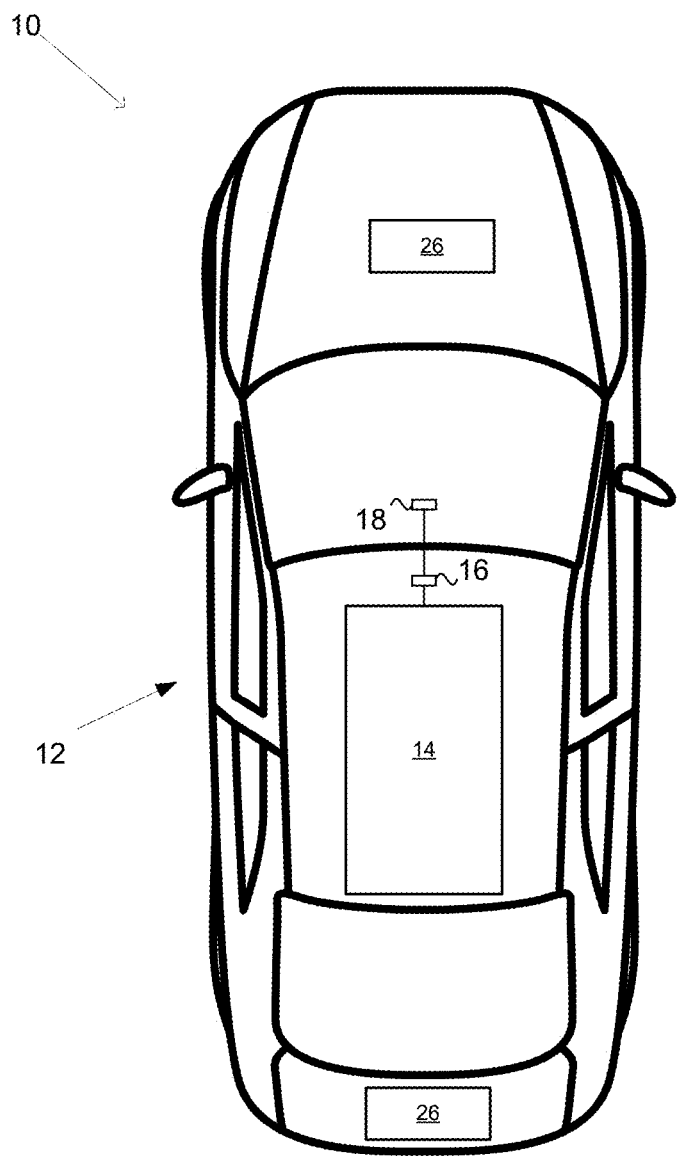
FIG. 1 is a plan view of a vehicle with a vehicular battery system that incorporates a battery for an electric vehicle.

Referring now to the drawings and the illustrative embodiments depicted therein, a vehicle 10 includes a vehicular power system 12 that includes at least one battery 14, such as a lithium-ion battery or the like (FIG. 1). The system 12 includes a control or electronic control unit (ECU) 18 having electronic circuitry and associated software, with the electronic circuitry including a data processor or image processor that is operable to process data captured by various sensors of the vehicle. The ECU 18 may provide data (e.g., vehicle speed requests) or other processing capabilities to the power system controller 16. The power system controller 16 operates between the battery 14 and, for example, one or more vehicle motors 26 to control the vehicle's speed and acceleration. When the motors 26 are alternating current (AC) motors, the power system controller 16 may transform direct current (DC) from the battery 14 into AC. The data transfer or signal communication from the power system controller 16 to the ECU 18 and/or battery 14 may comprise any suitable data or communication link, such as a vehicle network bus or the like of the equipped vehicle.

Figure 2:
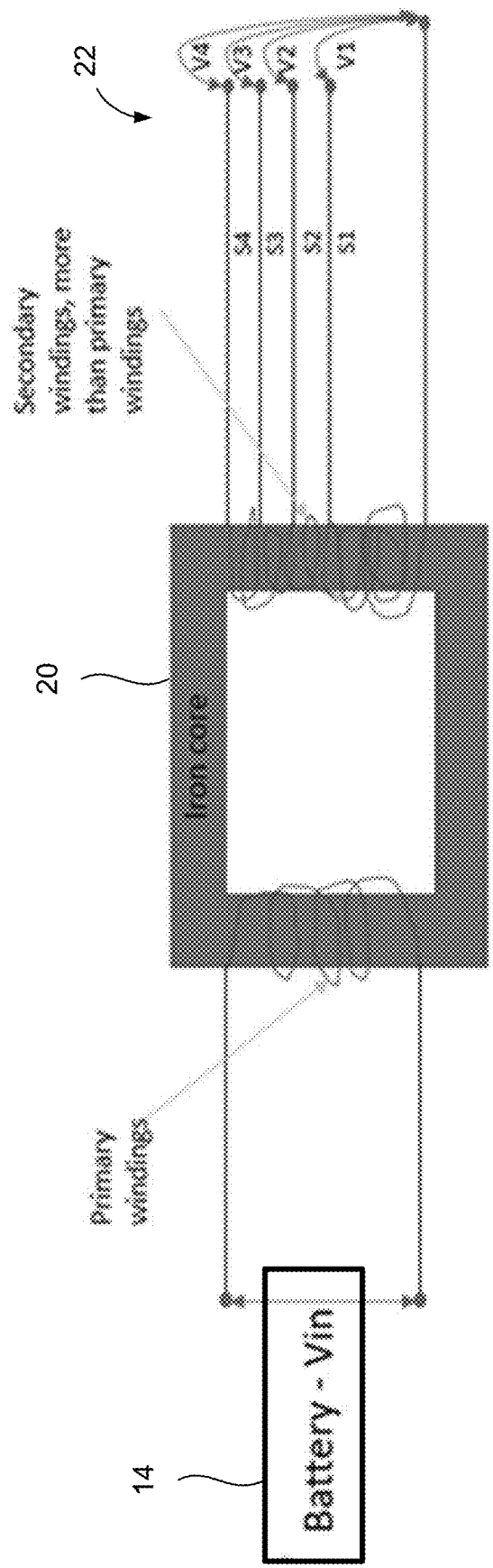
FIG. 2 is a schematic view of a transformer with multiple taps for the battery of FIG. 1.

Referring now to FIG. 2, as vehicle speed increases, the battery 14 may drain less efficiently. That is, the battery 14 may drain faster due to, for example, increased voltage and/or increased temperatures caused by providing the power to move the vehicle at a high rate of speed. To increase the efficiency of the battery (and thereby, for example, increase a range of the vehicle), the system includes a transformer 20 that is connected to the output of the battery 14 (i.e., connected between the battery 14 and any motors). The transformer 20 has multiple taps 22 (e.g., at least three taps, at least five taps, at least ten taps, etc.). Each tap 22 provides a different voltage level from a constant voltage provided by the battery 14. That is, the output of the battery 14 is fixed to a particular value or voltage that may remain constant regardless of driving speed. As higher speeds demand more power or energy, the power system controller 16 may adjust which tap 22 provides power to the motors 26. For example, at lower speeds, the power system controller 16 selects a lower tap (e.g., tap 1) while at higher speeds the power system controller 16 selects a higher tap (e.g., tap 5). A first tap may provide a first voltage (e.g., a primary voltage output of the battery 14), while a second tap may provide twice the first voltage, a third tap may provide three times the first voltage, a fourth tap may provide four times the first voltage, and so on.

The transformer 20 may have a number of primary windings (e.g., around an iron core) with the battery 14. Each tap 22 of the transformer 14 may have a different number of secondary windings, where the number of secondary windings dictates the voltage that the respective tap 22 provides. Optionally, each tap 22 has a number of secondary windings that is greater than the number of primary windings.

By using the transformer and selecting the different taps to provide different voltages to the motors 26, the battery output (e.g., voltage) may remain constant independent of driving speed and drain (due to inefficiencies) remains the same for all driving speeds. The battery output may be fixed to attain the lowest driving speed. The power system controller 16, using the transformer 20 and taps 22, may step the output voltage of the battery 16 up to achieve higher driving speeds while the battery 16 maintains the same voltage output. The highest tap 22 may achieve the highest driving speed the vehicle allows.

Figure 3:
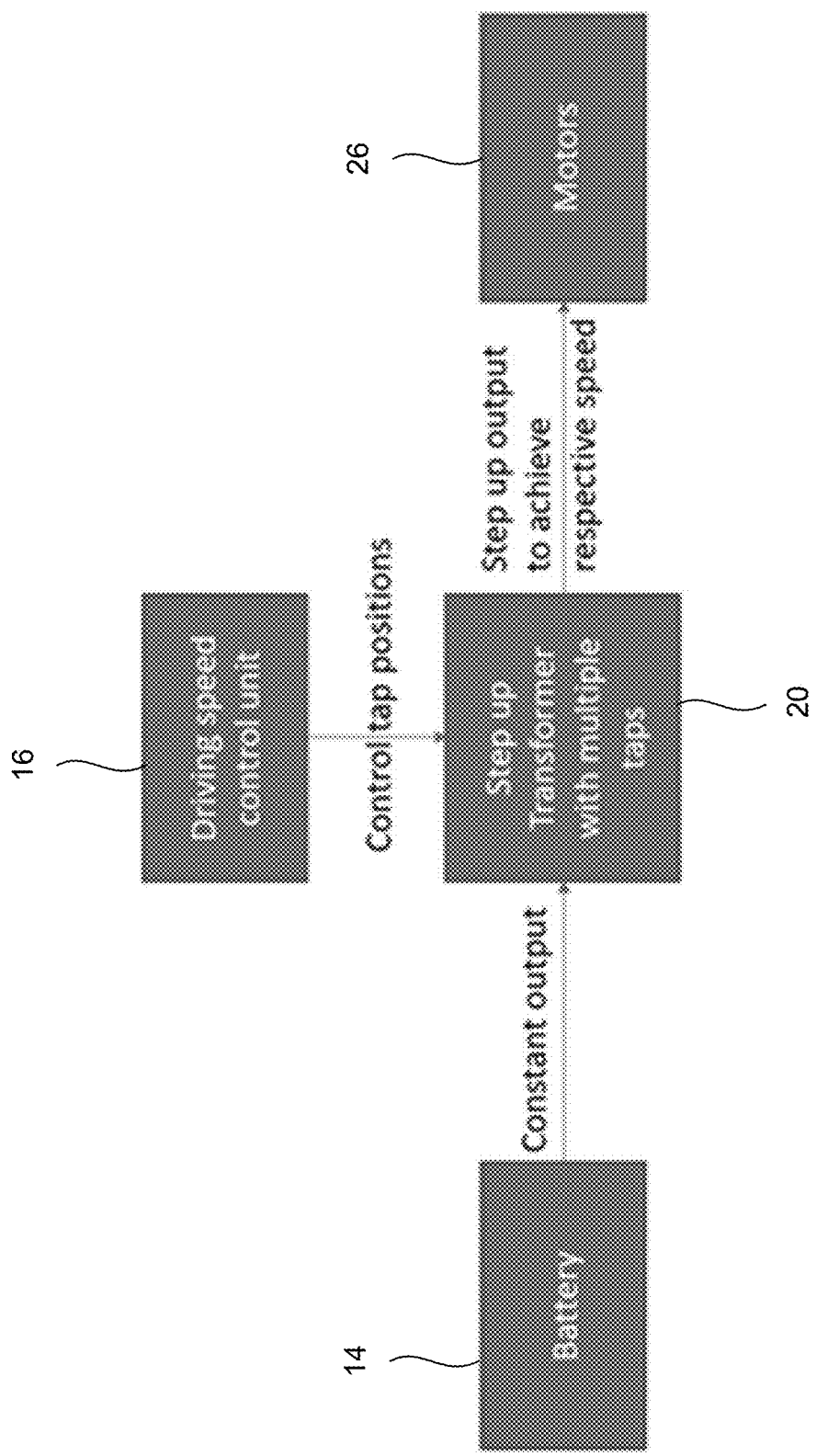
FIG. 3 is a block diagram for the vehicular battery system of FIG. 1.

Referring now to FIG. 3, the power system controller 16 (i.e., a driving speed control unit) receives inputs for a desired vehicle speed (e.g., from a driver of the vehicle or an autonomous or semi-autonomous driving system of the vehicle) and adjusts which tap is used to provide voltage to one or more motors 26 (e.g., DC motors and/or AC motors) to control the speed of the vehicle. For example, the driver may attempt to accelerate the vehicle by increasing pressure against the acceleration pedal. The power system controller 16 receives this input from the driver and adjusts which tap of the transformer 20 is connected to the motors 26 to adjust the voltage and/or frequency that is provided to the motors 26 (without changing the voltage draw on the battery). Optionally, the taps are physically moved by an actuator or other robotic function/mechanism controlled by the power system controller 16. In other examples, the power system controller 16 selects the tap based on electrical switching (e.g., via transistors or the like). Thus, based on the requested speed of the vehicle, the power system controller 16 mechanically or electrically adjusts which tap 22 of the transformer 20 that is electrically connected to the motor(s) 26.

Thus, the vehicular power system includes a transformer 20 in electrical connection with a battery 14. The transformer 20 includes multiple taps 22 that allows the voltage provided by the battery 14 to be stepped up to different values while allowing the battery 14 to provide a constant voltage output, allowing the battery to drain more efficiently. This allows the vehicle to achieve longer ranges by decreasing inefficiencies of the battery. Additionally, range of the vehicle becomes more predictable as the effect of vehicle speed on range is reduced or eliminated.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular power system, the vehicular power system comprising:
   a battery disposed at a vehicle equipped with the vehicular power system, wherein the battery outputs a constant battery voltage;
   an electrical motor disposed at the equipped vehicle, wherein the electrical motor, when electrically powered, controls propulsion of the equipped vehicle;
   a power system controller comprising electronic circuitry and associated software;
   a transformer electrically connected to the battery, wherein the transformer comprises a plurality of taps, and wherein each tap of the plurality of taps provides a different output voltage transformed from the constant battery voltage;
   wherein the power system controller, responsive to a vehicle speed request, determines one of the plurality of taps;
   wherein the power system controller electrically connects the determined one of the plurality of taps to the electrical motor, and wherein electrical power flows from the battery through the determined one of the plurality of taps to the electrical motor, and wherein the battery provides the electrical power at the constant battery voltage and the electrical motor receives the electrical power at the transformed output voltage of the determined one of the plurality of taps; and
   wherein the electrical motor, based on the electrical power from the determined one of the plurality of taps, adjusts speed of propulsion of the equipped vehicle toward the requested vehicle speed.

2. The vehicular power system of claim 1, wherein the power system controller controls an actuator to connect the determined one of the plurality of taps to the electrical motor.

3. The vehicular power system of claim 1, wherein the power system controller connects the determined one of the plurality of taps to the electrical motor via a transistor.

4. The vehicular power system of claim 1, wherein the power system controller, responsive to a second vehicle speed request, determines a second one of the plurality of taps, and wherein the power system controller electrically connects the determined second one of the plurality of taps to the electrical motor, and wherein electrical power flows from the battery through the determined second one of the plurality of taps to the electrical motor, and wherein the electrical motor, based on the electrical power from the determined second one of the plurality of taps, adjusts speed of propulsion of the equipped vehicle toward the second requested vehicle speed.

5. The vehicular power system of claim 1, wherein the electrical motor comprises a direct current (DC) electrical motor.

6. The vehicular power system of claim 1, wherein the electrical motor comprises an alternating current (AC) electrical motor.

7. The vehicular power system of claim 1, wherein the plurality of taps comprises at least five taps.

8. The vehicular power system of claim 1, wherein the power system controller determines a first tap of the plurality of taps for a minimum speed of the equipped vehicle, and wherein the power system controller determines a second tap of the plurality of taps for a maximum speed of the equipped vehicle.

9. The vehicular power system of claim 8, wherein the transformed output voltage of the second tap of the plurality of taps is greater than the transformed output voltage of the first tap of the plurality of taps.

10. The vehicular power system of claim 1, wherein the transformer comprises a number of primary windings.

11. The vehicular power system of claim 10, wherein each tap of the plurality of taps comprises a different number of secondary windings, and wherein the number of secondary windings of each tap of the plurality of taps is greater than the number of primary windings.

12. A vehicular power system, the vehicular power system comprising:
   a battery disposed at a vehicle equipped with the vehicular power system, wherein the battery outputs a constant battery voltage;
   an electrical motor disposed at the equipped vehicle, wherein the electrical motor, when electrically powered, controls propulsion of the equipped vehicle;
   a power system controller comprising electronic circuitry and associated software;
   a transformer electrically connected to the battery, wherein the transformer comprises a plurality of taps, and wherein each tap of the plurality of taps provides a different output voltage transformed from the constant battery voltage, and wherein the plurality of taps comprises at least five taps;

wherein the power system controller, responsive to a vehicle speed request, determines one of the plurality of taps;

wherein the power system controller electrically connects the determined one of the plurality of taps to the electrical motor, and wherein electrical power flows from the battery through the determined one of the plurality of taps to the electrical motor, and wherein the battery provides the electrical power at the constant battery voltage and the electrical motor receives the electrical power at the transformed output voltage of the determined one of the plurality of taps, and wherein the power system controller controls an actuator to connect the determined one of the plurality of taps to the electrical motor; and wherein the electrical motor, based on the electrical power from the determined one of the plurality of taps, adjusts speed of propulsion of the equipped vehicle toward the requested vehicle speed.

13. The vehicular power system of claim 12, wherein the power system controller, responsive to a second vehicle speed request, determines a second one of the plurality of taps, and wherein the power system controller electrically connects the determined second one of the plurality of taps to the electrical motor, and wherein electrical power flows from the battery through the determined second one of the plurality of taps to the electrical motor, and wherein the electrical motor, based on the electrical power from the determined second one of the plurality of taps, adjusts speed of propulsion of the equipped vehicle toward the second requested vehicle speed.

14. The vehicular power system of claim 12, wherein the electrical motor comprises a direct current (DC) electrical motor.

15. The vehicular power system of claim 12, wherein the electrical motor comprises an alternating current (AC) electrical motor.

16. The vehicular power system of claim 12, wherein the power system controller determines a first tap of the plurality of taps for a minimum speed of the equipped vehicle, and wherein the power system controller determines a second tap of the plurality of taps for a maximum speed of the equipped vehicle.

17. A vehicular power system, the vehicular power system comprising:

a battery disposed at a vehicle equipped with the vehicular power system, wherein the battery outputs a constant battery voltage;

an alternating current (AC) electrical motor disposed at the equipped vehicle, wherein the electrical motor, when electrically powered, controls propulsion of the equipped vehicle;

a power system controller comprising electronic circuitry and associated software;

a transformer electrically connected to the battery, wherein the transformer comprises a plurality of taps, and wherein each tap of the plurality of taps provides a different output voltage transformed from the constant battery voltage;

wherein the power system controller, responsive to a vehicle speed request, determines one of the plurality of taps;

wherein the power system controller electrically connects the determined one of the plurality of taps to the electrical motor, and wherein electrical power flows from the battery through the determined one of the plurality of taps to the electrical motor, and wherein the battery provides the electrical power at the constant battery voltage and the electrical motor receives the electrical power at the transformed output voltage of the determined one of the plurality of taps;

wherein the electrical motor, based on the electrical power from the determined one of the plurality of taps, adjusts speed of propulsion of the equipped vehicle toward the requested vehicle speed; and wherein the power system controller, responsive to a second vehicle speed request, determines a second one of the plurality of taps, and wherein the power system controller electrically connects the determined second one of the plurality of taps to the electrical motor, and wherein electrical power flows from the battery through the determined second one of the plurality of taps to the electrical motor, and wherein the electrical motor, based on the electrical power from the determined second one of the plurality of taps, adjusts speed of propulsion of the equipped vehicle toward the second requested vehicle speed.

18. The vehicular power system of claim 17, wherein the transformer comprises a number of primary windings.

19. The vehicular power system of claim 18, wherein each tap of the plurality of taps comprises a different number of secondary windings, and wherein the number of secondary windings of each tap of the plurality of taps is greater than the number of primary windings.

20. The vehicular power system of claim 19, wherein the power system controller connects the determined one of the plurality of taps to the electrical motor via a transistor.

* * * * *